United States Patent [19]
Johnston et al.

[11] Patent Number: 5,831,613
[45] Date of Patent: Nov. 3, 1998

[54] REMOVABLE STORAGE MEDIA STOP/EJECT SYSTEM FOR PERSONAL COMPUTERS

[75] Inventors: John E. Johnston, Redwood City; Christopher J. Raymond, San Jose, both of Calif.; William V. Oxford, Austin, Tex.; Ronald J. Moller, Boulder Creek, Calif.

[73] Assignee: Apple Computer, Inc., Cupertino, Calif.

[21] Appl. No.: 779,188

[22] Filed: Jan. 6, 1997

[51] Int. Cl.⁶ .......................................... G06F 3/00
[52] U.S. Cl. ............................. 345/339; 361/685
[58] Field of Search .................... 345/339; 711/111; 361/683, 684, 685, 686; 364/188, 189, 190

[56] References Cited

U.S. PATENT DOCUMENTS

| | | | |
|---|---|---|---|
| 5,138,925 | 8/1992 | Koguchi et al. | 84/609 |
| 5,525,977 | 6/1996 | Suman | 340/825.25 |
| 5,657,221 | 8/1997 | Warman et al. | 364/188 |
| 5,661,631 | 8/1997 | Crane, Jr. | 361/683 |
| 5,666,531 | 9/1997 | Martin | 707/204 |

*Primary Examiner*—A. Katbab
*Attorney, Agent, or Firm*—Burns, Doane, Swecker & Mathis, L.L.P.

[57] ABSTRACT

Manual actuation of a stop/eject button on a computer causes a signal to be sent to both the computer's operating system and to a wireless communication controller. The operating system interprets this signal in a manner analogous to a conventional signal to open the drawer, or door, of a compact disk drive device when a compact disk is not currently present in the drive device. If a compact disk is present in the device, the operating system ignores the signal. In this case, the communications controller operates in a normal fashion to interrupt access to the compact disk, instruct the operating system to unmount the disk, and thereafter eject the disk by opening the drive door.

15 Claims, 3 Drawing Sheets

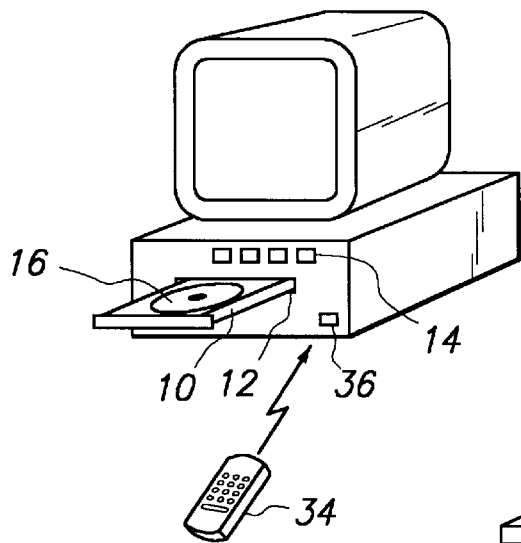
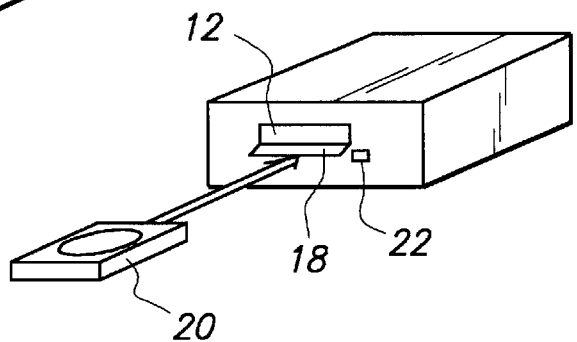
FIG. 1A
FIG. 1B
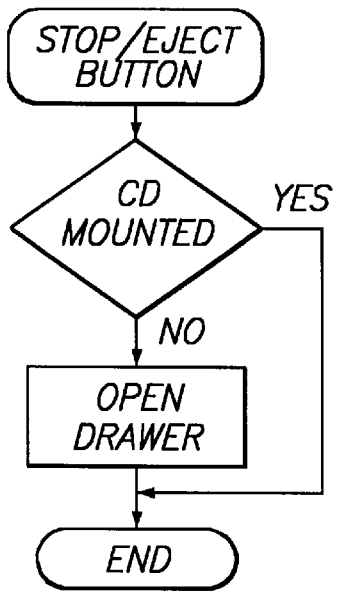
FIG. 2
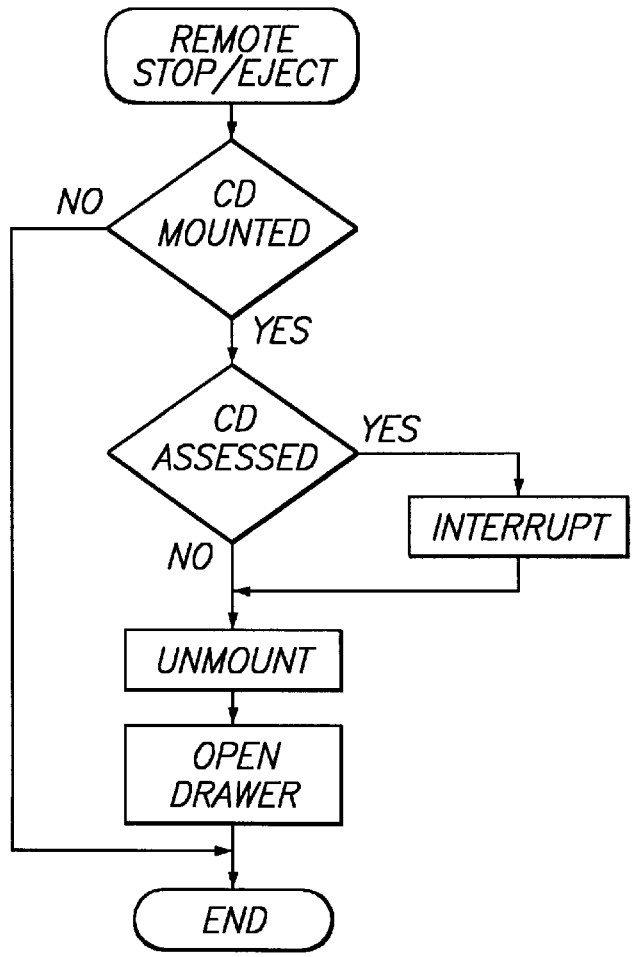
FIG. 4

REMOVABLE STORAGE MEDIA STOP/EJECT SYSTEM FOR PERSONAL COMPUTERS

FIELD OF THE INVENTION

The present invention is generally directed to the design and operation of personal computers, and more particularly to a system for controlling access to a removable storage media device in a computer.

BACKGROUND OF THE INVENTION

As the number and size of software programs and data files used in personal computers continues to grow, compact disk read-only memory (CD/ROM) has become a popular medium for distributing programs and files. Consequently, a large number of personal computers are equipped with CD/ROM drive devices, either as built-in components or externally attached through an I/O port. Most CD/ROM drives can be classified into two types. One type of drive device includes a drawer that slides in and out of the device. The user places a compact disk into a suitable opening in the drawer, and then closes the drawer to place the disk in a position to have its contents read by the computer. The other type of device has a door which provides access to an opening within the device. In this latter type of system, the user can insert the compact disk directly into the drive, or place the compact disk in a special housing, known as a "CD caddy", and then insert the caddy containing the disk into the drive device while the door is open.

Typically, the CD/ROM drive device is provided with a button, or similar type of manually-actuated member, to permit the user to open the drawer, or door, of the device, for the insertion and/or removal of compact disks. The behavior of the computer in response to the actuation of this button varies, in dependence upon the current state of the computer system. For example, in computers which employ the Macintosh Operating System, when no disk is present in the drawer, actuation of the button causes the drawer to open, so that the user can insert a disk. Thereafter, when the drawer is closed, the CD/ROM is mounted on the computer's desktop. Generally speaking, the "mounting" of a CD/ROM, or other type of storage volume, occurs when the computer's operating system reads descriptive information from the volume and stores that information in memory. Typically, the mounting of a volume on a computer is indicated by displaying an icon on the desktop of the computer, to notify the user that the volume can be accessed from that computer.

Once a CD/ROM in a drive device has been mounted on the desktop, the manually operated button is disabled. Thus, the user is not able to eject the disk by merely actuating the button. This functionality prevents inadvertent releases of a CD/ROM while information is being accessed from it, for example. In order to eject the CD/ROM, the user must enter a command through the operating system's user interface. For example, the user can drag the icon representing the mounted CD/ROM to a trash icon, or similar type of container. This action causes the CD/ROM to be unmounted, and the compact disk to then be ejected by opening the drawer. Alternatively, the user might select an "Eject" command from a menu.

Because of their relatively large storage capacity, CD-ROMs are often used for audio/visual applications. For example, users can play audio Cds on their computers, to listen to music while performing other tasks on the computer. Along these lines, the computer might also be provided with a controller that responds to commands transmitted from a remote control device via wireless communications. For example, the controller might be responsive to infrared signals from a remote control device, so that the user can control the play of music CDs on the computer in a manner analogous to the operation of a conventional CD audio system. To this end, the remote control device can include a button to eject the CD. In response to a signal generated by actuation of this button, the controller in the computer sends a command to any software which is accessing the compact disk to interrupt its operation. The controller then sends a command to the computer's operating system to unmount the volume. Finally, the controller instructs the CD drive device to eject the disk, causing its drawer or door to be opened.

With the increasing use of computers for audio and video applications, some types of computers are specially configured for ease of use in such situations. For example, the computer might have a set of buttons on its front panel which are mapped to the buttons of the remote control device, to provide the user with the ability to control volume, select tracks, etc. while sitting at the computer by simply pressing a button. Typically, an eject button is included in this set of buttons. If the computer's operating system responds to operation of this eject button in its normal manner, user frustration could result. More particularly, as described previously, once a compact disk is inserted in the drive device and mounted on the computer's desktop, actuation of the button will have no effect. To eject the disk, the user is required to issue a software-based command, through the user interface and/or other software. Alternatively, it is possible to provide the user with a remote control device, so that the ejection can be effected through the computer's wireless communication controller. However, such a solution may not always be practical, since remote control devices are easily misplaced.

Accordingly, it is desirable to provide a computer system in which normal functionality can be maintained, while at the same time providing the user with the ability to eject a compact disk regardless of the particular state of the computer system.

SUMMARY OF THE INVENTION

In accordance with the present invention, the foregoing objective is achieved by generating parallel signals in response to actuation of an eject button located on the computer housing. When the eject button is manually actuated by the user, a signal is sent to both the computer's operating system and to the wireless communication controller. The operating system interprets this signal in a manner analogous to the conventional signal to open the drawer, or door, of the compact disk drive device. Thus, if a compact disk is not currently mounted on the desktop, the operating system will cause the drawer to open. However, if a compact disk is currently present in the device and mounted on the desktop, the operating system ignores the signal. Conversely, the communications controller responds to the signal only if a compact disk is currently present in the drive device. If that is the case, the controller operates in the normal fashion to interrupt access to the compact disk, instruct the operating system to unmount the disk, and thereafter eject the disk by opening the drawer, or door.

By means of the foregoing approach, the user is provided with desired behavior in response to actuation of the CD/ROM eject button on the computer. However, no modification of existing computer components, notably the operating system and the communications controller, is required to achieve this functionality.

The foregoing features of the invention, as well as the advantages achieved thereby, are described in greater detail hereinafter with reference to specific embodiments illustrated in the accompanying drawings.

BRIEF DESCRIPTION OF THE DRAWINGS

FIG. 1A is a perspective view of a computer having one type of compact disk drive;

FIG. 1B is a perspective view of a computer having another type of compact disk drive;

FIG. 2 is a flow chart depicting the process carried out by the computer's operating system in response to the actuation of a stop/eject button;

FIG. 4 is a flow chart depicting the operation of the I/O controller in response to receipt of a remote stop/eject signal;

DETAILED DESCRIPTION

Figure 3A:
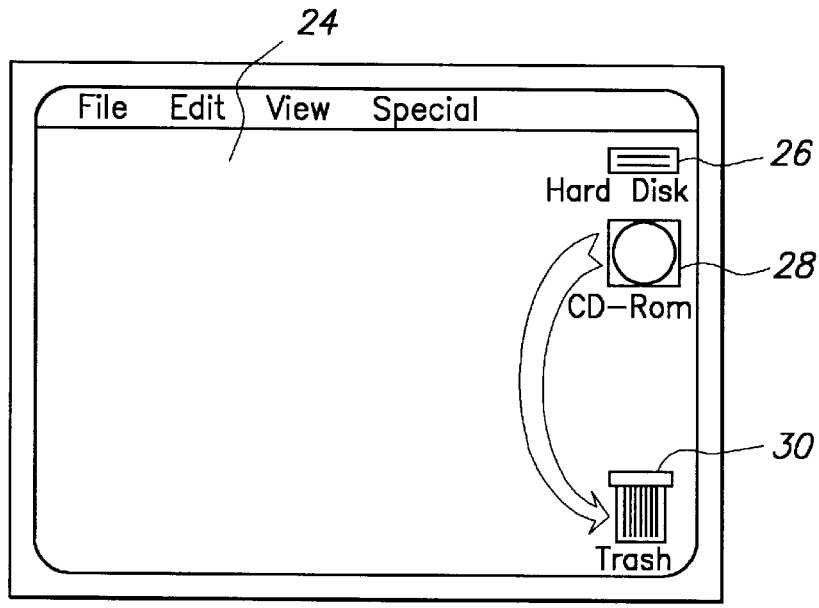
FIGS. 3A, 3B and 3C are illustrations of a computer desktop for a graphical user interface.

To facilitate an understanding of the present invention, embodiments thereof are described hereinafter with particular reference to the insertion and ejection of a compact disk in a computer. Compact disks are employed in a variety of different environments, including stereo audio systems, video players, and computers. It is an objective of the invention to provide behavior in a computer that is consistent with these other environments, insofar as the insertion and ejection of compact disks is concerned. It will be appreciated, however, that the principles of the invention are not limited to use with compact disks. Rather, they are applicable to any type of removable storage media in which it is desirable to provide software control, as well as user-implemented control, over the ejection of such media.

FIGS. 1A and 1B illustrate two examples of computers which have internal compact disk drive devices. The device in the computer of FIG. 1A employs a drawer 10 which slides into and out of an opening 12 on the front of the computer housing. The user can cause the drawer to move to its open position, illustrated in FIG. 1A, by actuating a button 14 which is also located on the front panel of the computer. This button might be a stand-alone button for this purpose or, as illustrated in FIG. 1A, it could be one of a series of buttons which are respectively related to different types of A/V functions, such as volume control, play, etc. In this latter case, the button 14 is associated with a "stop/eject" function. When the drawer 10 is in its open position, as shown in FIG. 1A, the user can insert a compact disk in a suitable recess 16 within the drawer, and then close the drawer, for example by pushing it back into the computer housing.

FIG. 1B illustrates an alternative configuration for the compact disk drive device. Rather than a drawer, the device of FIG. 1B includes a door 18 which permits access to the opening 12 in the housing. To insert a compact disk into the computer, the user might place the disk in a suitable receptacle 20, e.g. a CD caddy, and then insert the caddy into the opening 12. Alternatively, the disk might be directly inserted into the opening 12. Once the disk has been fully inserted, the door 16 is closed. Again, the opening of the door 18, to provide access to the opening 12, is effected through a manually actuated button 22 on the front panel of the computer. Although not illustrated in FIG. 1B, the button 22 could be one of a series of buttons that are respectively associated with different A/V functions, as in the embodiment of FIG. 1A. When the door 18 is opened, a suitable conventional mechanism within the disk drive device causes any disk housed therein to be automatically ejected.

Throughout the remaining discussion, the invention will be described with particular reference to its implementation in the computer illustrated in FIG. 1A, in which the compact disk drive device includes a drawer. However, it will be appreciated that the invention is equally applicable to drive devices of the type illustrated in FIG. 1B. Further in this regard, other types of drive devices which employ neither a drawer nor a door, but which include some form of mechanism for automatically ejecting compact disks or other removable storage media, can also be used to implement the invention.

When a compact disk is inserted in the disk drive, by closing the drawer 10, the disk is "mounted" on the computer. Every disk, and other type of storage volume, contains information which describes the disk, such as its name and the number of files which it contains. The mounting operation basically involves reading this descriptive information from the disk, and storing it at a designed location within the working memory of the computer, i.e. RAM. As long as the memory is allocated to the disk, it is considered to be "mounted." The unmounting of a disk occurs when the computer releases the portion of memory in which the disk information is stored.

The opening of the CD drawer 10 is controlled by the computer's operating system, which is responsive to the particular state of the computer. Referring to the flow chart of FIG. 2, when the user actuates the stop/eject button 14, the operating system determines whether a compact disk is currently in the drive and mounted on the computer. If no disk is mounted, e.g. the disk drive drawer is empty, the operating system sends a signal to open the drawer. If, however, a CD is mounted on the computer, the stop/eject signal from the button 14 is ignored, and no action is taken.

Figure 3B:
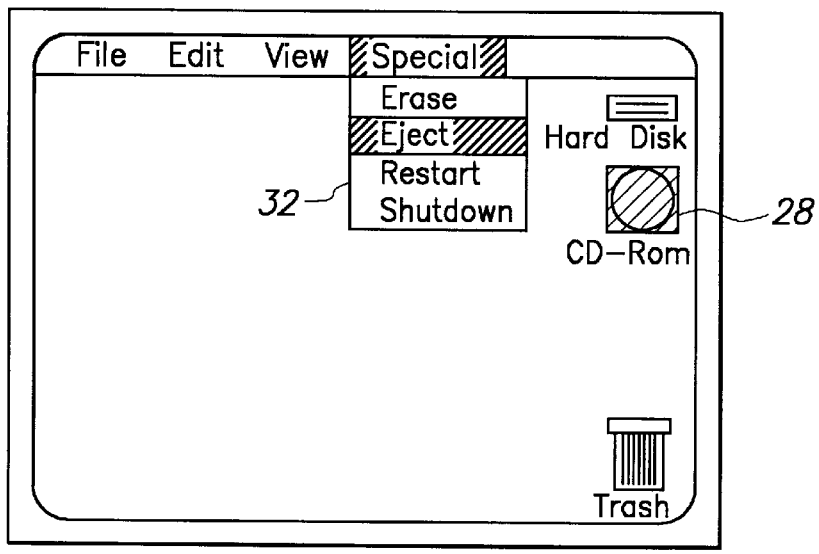

In order to eject a disk which is mounted on the computer, the user must issue a suitable software command. Referring to FIG. 3A, when a storage volume is mounted on the computer, an icon is displayed to indicate the fact that the storage volume can be accessed from the computer. For example, the icon might be displayed within a file management utility, or on the desktop 24 of the computer's graphical user interface. FIG. 3A illustrates an example of a desktop for a computer having two mounted storage volumes, namely a hard disk and a CD/ROM, as depicted by the icons 26 and 28, respectively. For any storage volume which is removable, such as the CD/ROM, the user can perform a drag-and-drop operation to cause it to be ejected. For example, as illustrated in FIG. 3A, the icon for the CD/ROM can be dragged onto a trash icon 30 and released. When this happens, the operating system responds by unmounting the CD/ROM, and then issuing a command to open the drawer. Alternatively, as illustrated in FIG. 3B, the user might select the icon 28 for the CD/ROM, and then chose an eject command from a pull-down menu 32.

Figure 3C:
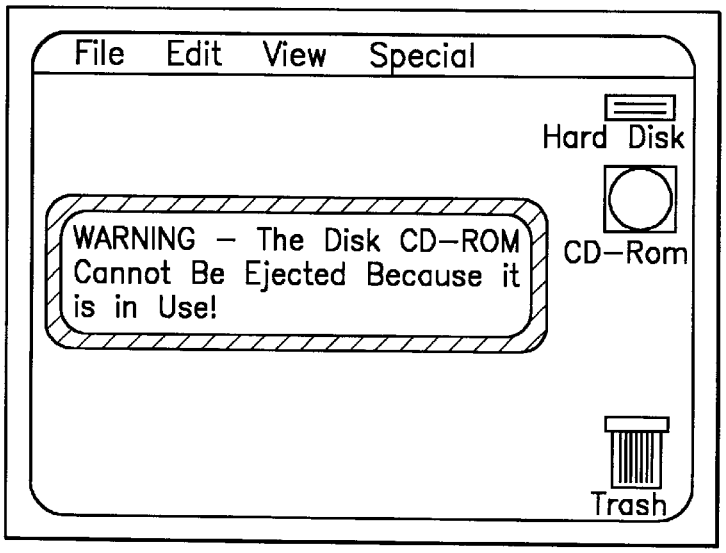

However, the software-based commands issued to the operating system to eject the CD/ROM are only carried out if the CD is not currently being used. It may be the case that the CD is an audio disk, and the computer is playing music on the disk while the user performs other tasks on the computer. The playback of the music might be carried out by a suitable application program that is loaded on the computer. If the user attempts to drag the icon 28 for the CD/ROM to the trash icon 30 while the music is playing, the operating system will issue an alert, for example as illustrated in FIG. 3C, to warn the user that the disk is currently in use, and therefore cannot be ejected. In order to eject the disk in this situation, the user must issue a stop command through the application program which is playing the music, and then request that the disk be ejected, either through that program or through the operating system's user interface.

Some computers are equipped to accept commands from remote control devices. Referring again to FIG. 1, a remote control device 34 can be used to transmit commands to the computer via wireless communications, for example infrared (IR) signals. The front panel of the computer includes an IR sensor 36, which relays the received IR signals to a suitable controller for wireless communications (not shown in FIG. 1). In the following description, such a controller is referred to as an IR controller, although it will be recognized that other types of wireless communications, such as radio wave communications, can also be employed.

One of the buttons on the remote control device 34 pertains to a stop/eject function, in a manner analogous to a conventional CD audio or video system. With reference to FIG. 4, upon receipt of the stop/eject command from the remote control device, the IR controller first determines whether a compact disk is mounted on the computer. If no CD is mounted, no further action is taken. If, however, a CD is mounted on the computer, the IR controller then determines whether the CD is currently being accessed by any software programs. If so, it sends an interrupt command to each such program, to halt their access of the data on the compact disk. Thus, in the case of an audio CD, the play of the music would be stopped. Once all access to the disk has terminated, the IR controller sends a command to the operating system to unmount the disk. Thereafter, a command is sent to the disk drive device, to open the drawer.

From the foregoing description, it can be seen that the opening of the drawer 10 under the control of the computer's operating system is dependent upon the particular state of the computer. If no compact disk is present in the drawer, it can be opened through actuation of the button 14. However, if a compact disk is present and mounted on the computer, the drawer can only be opened, to eject the disk, by issuing commands through the operating system's user interface. Even then, this action can only be accomplished if the disk is not being currently accessed. If the disk is currently in use, the software programs which are accessing the disk must first be interrupted, through other user-generated commands, before the disk can be ejected. These actions are inconsistent with those provided by a stop/eject button on the remote control device 34, as well as those which a user might experience in connection with other compact disk devices, such as stereo systems and video players.

Figure 5:
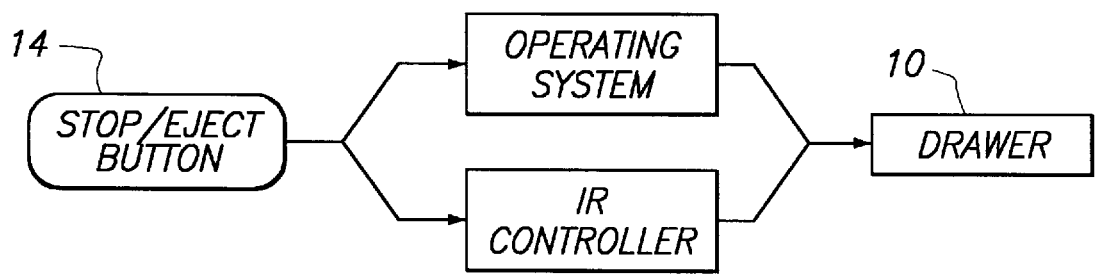
FIG. 5 is a block diagram illustrating the parallel transmission of a stop/eject signal to the operating system and the I/O controller.

In accordance with the present invention, the actions that are carried out in response to the stop/eject button 14 on the computer can be made consistent with those provided by other compact disk devices without requiring any significant modification of the computer system. This result is accomplished by employing the stop/eject signal generated by the button 14 in a two-fold manner. Referring to FIG. 5, when the stop/eject button 14 is actuated, parallel signals are sent to each of the operating system and the IR controller. For example, a switch that is associated with the button 14 can be connected to the input terminal of two logic gates, which respectively send output terminals to the operating system and the IR controller. As illustrated by the flow charts of FIGS. 2 and 4, the operations of these two components of the computer, in response to a stop/eject command, are complementary to one another. More particularly, if a compact disk is not mounted on a computer, the IR controller takes no action, and the operating system functions to open the disk drive drawer. Conversely, if a CD is mounted on the computer, the operating system takes no action, but the IR controller carries out all actions necessary to interrupt access of the disk, unmount the disk, and open the drawer. Thus, depending on the current state of the computer system, one of the two parallel signals is ignored and the other is responded to by the appropriate system component. The end result is that the operation desired by the user is carried out. If the user desires to insert a disk in an empty drawer, the operating system opens the drawer so that the user can load the disk and thereafter have it mounted. Conversely, if the user desires to eject a disk that is currently playing, the IR controller responds in a fashion analogous to the operation of a typical CD audio system.

The opening of the drawer in response to the commands from the operating system and/or the IR controller can be carried out in a number of different ways. In one embodiment, the drawer can be moved in and out by a motor that is controlled by logic responsive to the open drawer command. In such a case, the stop/eject button 14 on the computer can be used to close the drawer as well as open it. In other words, successive actuations of the button 14 toggle the motor to move the drawer between the open and closed positions. In place of a motor, a solenoid can be used to translate the drawer between the open and closed positions.

In another embodiment, the drawer can be spring-loaded to be in a normally open position. When the drawer is pushed to its closed position, it is held in place by a logic-controlled latch mechanism. The latch mechanism normally holds the drawer in its closed position, but is responsive to the open drawer command from the operating system and/or the IR controller to release the drawer, and thereby allow it to open under the force of one or more springs.

Figure 6:
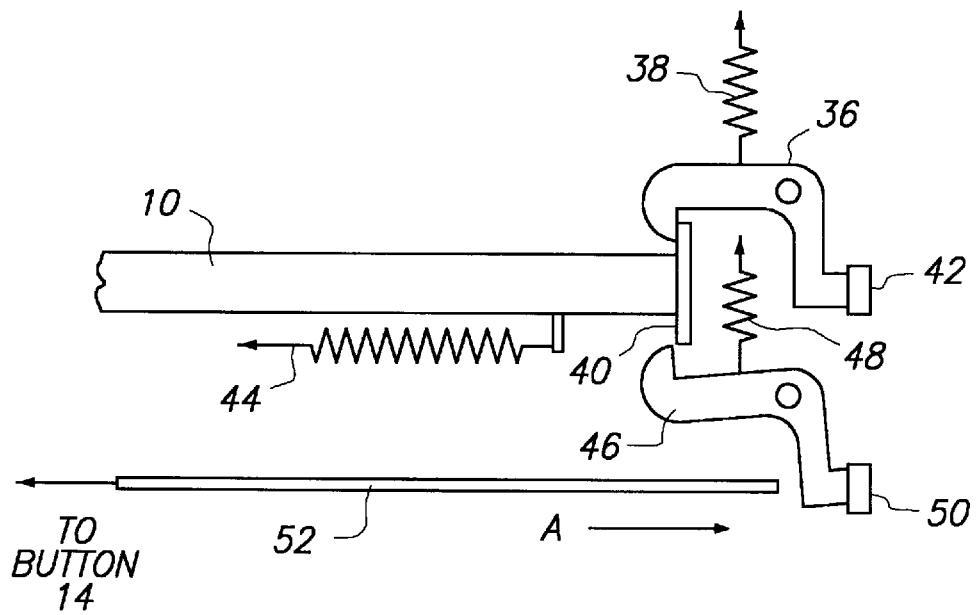
FIG. 6 is a side view of one embodiment of a mechanism for controlling the drawer of a CD drive device.

In these embodiments, the opening of the drawer is carried out in response to electronic signals. Thus, the drawer can only be opened when the computer is turned on. In some situations, it may be desirable to permit the drawer to be opened when the computer's power is turned off. For example, the user may desire to retrieve a CD that is housed within the computer, without having to wait for the computer to boot up. In a third embodiment illustrated in FIG. 6, two latching mechanisms can be employed. One latching mechanism functions to normally hold the drawer closed whenever the computer is powered up, and to release the drawer in response to commands from the operating system and the IR controller. The mechanism includes a latch pawl 36 which is biased by a spring 38 to a position where it is disengaged from a flange 40 on the rear end of the drawer 10. When the computer is powered up, the pawl 36 is pivoted in a counterclockwise direction, as illustrated in FIG. 6, under the force of an electromagnet 42, or a solenoid. In this case, the pawl engages the flange 40, to maintain the drawer in its closed position. If the operating system or the IR controller issues a command to open the drawer, the power to the electromagnet 42 is momentarily interrupted, to cause the pawl to rotate in a clockwise direction under the bias of the spring 38. As a result, the drawer 10 opens to the left, under the force of a spring 44. If a door is employed in place of a drawer, the hinges of the door can be spring-loaded to bias the door open when the latch pawl 36 is disengaged.

A second latch mechanism includes a latch pawl 46 that is biased into engagement with the flange 40 by a spring 48. When the computer is powered up, the pawl 46 is pivoted out of engagement with the flange 40 by an electromagnet 50. Thus, during normal operation of the computer, the pawl 36 of the first latch mechanism engages the flange 40 to hold the drawer closed, and the pawl 46 of the second latch mechanism is held in a disengaged position, as illustrated in FIG. 6. The opening of the drawer is controlled by a logic signal to the electromagnet 42, to interrupt its power and permit the pawl 36 to release the drawer.

When the power to the computer is turned off, the respective positions of the two pawls 36 and 46 are reversed, due to the forces exerted by their bias springs 38 and 48. In other words, the pawl 36 is disengaged, and the pawl 46 engages the drawer 10, to keep it closed. To ensure that the drawer remains closed as power is turned off, the distances of travel of the pawls and/or the forces of the springs 38 and 48 can be adjusted relative to one another, so that the pawl 46 engages the drawer 10 before the pawl 36 becomes disengaged.

When the pawl 46 is engaged with the flange 40, it abuts a rod 52 that is mechanically linked to the push button 14. Pressing the button 14 causes the rod 52 to move in the direction of the arrow A. As a result, the pawl 46 is pivoted out of engagement with the flange 40, to release the drawer 10. Thus, the user is able to open the drawer even when there is no power to the computer.

In an alternative to this third embodiment, the functions of both pawls can be integrated into a single pawl which corresponds to the second latch pawl 46. In this alternative embodiment, the electromagnet 50 is normally off, so that the pawl maintains the drawer closed in both the powered and unpowered states, under the bias of the spring 48. When either the operating system or the IR controller sends a signal to open the drawer, the electromagnet 50 is energized to disengage the pawl from the flange, and thereby release the drawer 10. Again, in the unpowered state, the drawer can be mechanically released by moving the rod in the direction of the arrow A.

From the foregoing, it can be seen that the present invention provides a computer system in which access to the compact disk drive device is carried out under software control, and yet the stop/eject button behaves in a manner desired by the user, without requiring any significant modification of existing computer design. It will be appreciated by those of ordinary skill in the art that the present invention can be embodied in other forms without departing from the spirit or essential characteristics thereof. For example, although explicitly disclosed in the context of a drive device for compact disks, it can be appreciated that the invention can be applied to other types of removable storage media with equal success. The presently disclosed embodiments are therefore considered in all respects to be illustrative, and not restrictive. The scope of the invention is indicated by the appended claims, rather than the foregoing description, and all changes that come within the meaning and range of equivalents thereof are intended to be embraced therein.

What is claimed is:

1. A computer, comprising:
  a housing having an opening for accepting removable storage media;
  a mechanism for selectively providing access to said opening to insert and remove a storage medium;
  a controller which is responsive to a remotely generated command to actuate said mechanism to provide access to said opening;
  a manually-actuated member on said housing;
  an operating system that is responsive to said member to actuate said mechanism to provide access to said opening; and
  means responsive to actuation of said member for transmitting a signal to both of said operating system and said controller to cause one of them to actuate said mechanism to provide access to said opening.

2. The computer of claim 1 wherein said mechanism includes a drawer that slides in and out of said opening, and which houses a removable storage medium.

3. The computer of claim 1 wherein said mechanism includes a door that provides access to said opening.

4. The computer of claim 1 further including a remote control device for transmitting said remotely generated commands to said controller via wireless communications.

5. The computer of claim 1 wherein the command generated by said controller causes said mechanism to eject a removable storage medium from said opening.

6. The computer of claim 1 wherein said operating system actuates said mechanism when a removable storage medium is not present in said opening.

7. The computer of claim 1 wherein said operating system and said controller operate in a complementary manner, such that said operating system actuates said mechanism when a removable storage medium is not present in said opening, and said controller actuates said mechanism when a removable storage medium is present in said opening.

8. The computer of claim 7 wherein the command generated by said controller causes said mechanism to eject a removable storage medium from said opening.

9. The computer of claim 1 wherein said mechanism includes:
  a movable device that is biased to a first position to provide access to said opening;
  a latch mechanism which engages said movable device to hold it in a second position which inhibits access to said opening and which is responsive to said operating system and said controller to release said movable device and enable it to move to said first position; and
  a mechanical link connecting said latch to said manually-actuated member such that, upon actuation of said member, said latch is moved out of engagement with said movable device.

10. A computer, comprising:
  a housing having an opening for accepting removable storage media;
  a mechanism for ejecting a removable storage medium from said opening;
  an operating system having a user interface responsive to software-based commands entered by a user to unmount a removable storage medium which is located in said opening and to actuate said mechanism to eject said storage medium;
  a controller which is responsive to a remotely generated command to actuate said mechanism to eject the removable storage medium from said opening;
  a manually-actuated member on said housing; and
  means responsive to actuation of said member for transmitting a signal to both of said user interface and said controller to cause one of them to eject a removable storage medium from said opening.

11. The computer of claim 10 wherein said mechanism includes a drawer that slides in and out of said opening, and which houses a removable storage medium.

12. The computer of claim 10 wherein said mechanism includes a door that provides access to said opening.

13. The computer of claim 10 further including a remote control device for transmitting said remotely generated commands to said controller via wireless communications.

14. The computer of claim 10 wherein said mechanism includes:

a movable device that is biased to a first position to provide access to said opening;

a latch mechanism which engages said movable device to hold it in a second position which inhibits access to said opening and which is responsive to said operating system and said controller to release said movable device and enable it to move to said first position; and a mechanical link connecting said latch mechanism to said manually-actuated member such that, upon actuation of said member, said latch mechanism is moved out of engagement with said movable device.

15. In a computer having a housing with an opening for accepting removable storage media, a mechanism for selectively providing access to said opening, an operating system, a controller which is responsive to remotely generated commands, and a manually actuated member, a method for providing access to said opening, comprising the steps of:

detecting actuation of said member;

transmitting a signal to each of said operating system and said controller in response to actuation of said member;

determining whether a removable storage medium is present in said opening;

generating a command via said operating system to actuate said mechanism to provide access to said opening if a removable storage device is not present in said opening; and generating a command via said controller to actuate said mechanism to provide access to said opening if a removable storage device is present in said opening.

\* \* \* \* \*